(12) United States Patent
Gubela

(10) Patent No.: US 10,761,249 B2
(45) Date of Patent: Sep. 1, 2020

(54) RETROREFLECTOR

(71) Applicant: Hans-Erich Gubela, Kappelrodeck (DE)

(72) Inventor: Hans-Erich Gubela, Kappelrodeck (DE)

(*) Notice: Subject to any disclaimer, the term of this patent is extended or adjusted under 35 U.S.C. 154(b) by 0 days.

(21) Appl. No.: 16/423,592

(22) Filed: May 28, 2019

(65) Prior Publication Data

US 2020/0025982 A1 Jan. 23, 2020

(30) Foreign Application Priority Data

Jul. 20, 2018 (DE) .................. 10 2018 117 569

(51) Int. Cl.
*G02B 5/122* (2006.01)
*B29D 11/00* (2006.01)

(52) U.S. Cl.
CPC ........ *G02B 5/122* (2013.01); *B29D 11/00615* (2013.01); *B29D 11/00625* (2013.01); *B29K 2995/005* (2013.01)

(58) Field of Classification Search
CPC .. G02B 5/122; G02B 5/124; B29D 11/00625; B29D 11/00615; B29K 2995/005
USPC ........................................................ 359/529
See application file for complete search history.

(56) References Cited

U.S. PATENT DOCUMENTS

| | | | |
|---|---|---|---|
| 2,107,833 A * | 2/1938 | Henri ..................... | G02B 5/124 359/530 |
| 3,810,804 A | 5/1974 | Rowland | |
| 3,883,224 A * | 5/1975 | Tanaka ................... | G02B 5/124 359/530 |
| 5,339,302 A | 8/1994 | Takahashi et al. | |
| 7,135,671 B2 | 11/2006 | Gubela, Sr. | |
| 2002/0141060 A1 | 10/2002 | Lu et al. | |
| 2007/0242334 A1 | 10/2007 | Selbrede et al. | |

(Continued)

FOREIGN PATENT DOCUMENTS

| | | |
|---|---|---|
| DE | 23 65 315 A1 | 4/1975 |
| DE | 84 25 522.6 U1 | 12/1984 |

(Continued)

OTHER PUBLICATIONS

P.R. Yoder, Jr., "Study of Light Deviation Errors in Triple Mirrors and Tetrahedral Prisms", Journal of the Optical Society of America, vol. 48, No. 7, pp. 496-499, Jul. 1958.

(Continued)

*Primary Examiner* — Euncha P Cherry
(74) *Attorney, Agent, or Firm* — Collard & Roe, P.C.

(57) ABSTRACT

A retroreflector includes a regular arrangement of multiple reflective triples of the first type, each having three side surfaces of the first type, which triples stand approximately perpendicular to one another, in pairs, and define a cube corner having an apex, at which the planes spanned by the three side surfaces of the first type intersect. A number of selected triples of the first type each have a recess, in particular a cube-shaped recess in the surface of the related cube corner and/or an elevation, in particular a cube-shaped elevation projecting from the surface of the related cube corner, which forms a triple of the second type, wherein the triples of the second type each have at least three side surfaces of the second type, which stand approximately perpendicular to one another, in pairs.

18 Claims, 17 Drawing Sheets

(56) References Cited

U.S. PATENT DOCUMENTS

2012/0081787 A1* 4/2012 Mimura ................ G02B 5/124
  359/530
2016/0246063 A1* 8/2016 Smith .................... G01S 7/497

FOREIGN PATENT DOCUMENTS

| DE | 42 36 779 A1 | 5/1993 |
| DE | 44 29 683 C1 | 3/1996 |
| DE | 102 16 579 A1 | 10/2003 |
| EP | 1 811 321 A1 | 7/2007 |

OTHER PUBLICATIONS

European Office Action in EP 19173004.3-1020, dated Dec. 3, 2019, with English translation of relevant parts.

\* cited by examiner

601

701

1101

1201
1215
1217

1301

1401

1501

RETROREFLECTOR

CROSS REFERENCE TO RELATED APPLICATIONS

Applicant claims priority under 35 U.S.C. § 119 of German Application No. 10 2018 117 569.8 filed Jul. 20, 2018, the disclosure of which is incorporated by reference.

BACKGROUND OF THE INVENTION

1. Field of the Invention

The invention relates to a retroreflector, which is suitable, among other things, for identification marking and for use in security elements.

The term retroreflector is intended to be understood to mean optical elements that guide incident light coming in at a specific angle range back to the light source, independent of the precise incidence angle. Certain deviations of the retroreflected beam from the incidence direction are possible, in this regard, in part, for example if the light source and the intended recipient of the reflected radiation are not in precise alignment, viewed from the reflector. Actually, such deviations can be desirable,

2. Description of the Related Art

Different types of retroreflectors are known. A known type of reflective elements or, stated more precisely, retroreflective elements is represented, for example, by films having embedded microspheres in front of a reflective layer. In general, reflective elements that comprise one or more Cube Corner elements for retroreflection have a clearly higher degree of retroreflection and therefore a clearly higher degree of effectiveness than such microsphere-based films. Such a Cube Corner ("cube corner") consists, in this regard, of three surfaces that stand essentially perpendicular to one another, in each instance, and is therefore also called a triple. A corresponding retroreflector, in this regard, generally comprises a plurality of such triples, which are therefore regularly disposed in an array. The regular arrangement to form a Cube Corner reflector is referred to as a triple array.

If, in this regard, the three triple surfaces do not stand precisely perpendicular to one another, then the direction of at least part of the reflected light will deviate from the direction of the incident light by a certain amount. This effect is described, for example, in the article "Study of Light Deviation Errors in Triple Mirrors and Tetrahedral Prisms" by P. R. Yoder, Journal of the Optical Society of America, Vol. 48, No. 7, pages 496-499, July 1958. A deviation from the right angle, however, can be advantageous for certain applications, such as wide-angle structures in road traffic or for light deflection.

In many applications, the triples consist of tetrahedral structures (for example: U.S. Pat. No. 3,810,804 A, applicant: Rowland Dev. Corp.), in other words of half cubes that are cut off along a diagonal. Such pyramid structures have the disadvantage that because of dead surfaces, in other words surfaces, the reflected beams of which cannot be reflected further, they have a maximal degree of effectiveness of approximately 66%.

Also, arrangements in which the three surfaces, which essentially stand perpendicular to one another, in each instance, are square and of the same size are also very frequent. They then form a corner (in other words three surfaces that come together in a point) of a cube. Such a special triple will be referred to as a Full Cube hereinafter. The spatial diagonal of this imaginary cube forms what is called the triple axis. If the light entry surface on which the triple is illuminated, in other words the aperture surface, is perpendicular to the triple axis, then in the case of the Full Cube, with light incidence parallel to the triple axis, ideally 100% of the incident light will be reflected back in the starting direction, and this feature results in a high degree of effectiveness of reflectors equipped with these triples. The basic shape of the Full Cube geometry is hexagonal. A basic shape is understood to be a projection into a plane that is spanned by vectors along which the triples are disposed in the manner of a regular lattice.

Another important geometry of retroreflectors is Gubela triples (see FIG. 3 of DE 4236779 A1, applicant: Hans-Erich Gubela, Sen.). In the geometry of the Gubela triples, a first side surface of the triples is formed by a main groove that runs longitudinally out of a cuboid, and the second and third side surfaces of the triples are formed by a series of secondary grooves that run normal to the first side surface and parallel to one another. The Gubela triple geometry has a rectangular basic shape.

SUMMARY OF THE INVENTION

Recently, there has been an increasing demand for structures that cover different angle ranges of reflection, but have a uniform appearance over the entire reflector. On the other hand, it is desirable, in the sector of security applications, that a structure such as a text or a specific pattern appears at least when viewed at certain angles, and changes its appearance when observed at a second angle.

Both of these effects can be achieved with a retroreflector according to the invention. The retroreflector according to the invention is characterized in that recesses are provided at a predetermined location of some selected triple elements. Preferably, the recesses are situated at the apex of the corresponding triple, in other words at the point at which the three planes spanned by the side surfaces of the triple intersect. The recesses form the triples of the second type. The recesses are based on the basic shape of a cuboid. The cuboid shape can, however, be cut off by means of rotations at the planes spanned by the side surfaces of the triples of the first type or at auxiliary planes of the triple geometry, but have at least three side surfaces that stand almost at a right angle to one another. In simplifying manner, here one speaks of cuboid-like triples of the second type. The triples of the second type are therefore a triple in the triple. If the triples of the second type are formed by recesses, a side surface of the triple of the second type interacts with two side surfaces of the related triple of the first type in the reflector, in each instance. The side surfaces of the triples of the first type are also referred to as side surfaces of the first type hereinafter; the side surfaces of the triples of the second type are referred to as side surfaces of the second type.

Preferably, at least two edge lengths of the triples of the second type are at most half as large as the corresponding edge lengths of the triples of the first type. The smaller the edge lengths of the triples of the second type are in relationship with the edge lengths of the triples of the first type, the better the efficiency of the remaining retroreflector. For this reason, it is particularly advantageous if the edge lengths of the triples of the second type are at most one-tenth as large as the corresponding edge lengths of the triples of the first type. The reflection power can be further optimized if the recesses are also cube-shaped. As a result, all the edge lengths of the triples of the second type are at most half as large, preferably at most one-tenth as large as the corresponding edge lengths of the triples of the first type.

The invention can be carried out both in the Full Cube geometry and in the Gubela triple geometry, and also in the case of pyramid-shaped reflectors. Both geometries demonstrate the highest reflection power, in this regard.

In an alternative embodiment, a cuboid-like elevation from the surface of the cube corner having the apex is provided instead of or in addition to recesses. The elevation is preferably disposed at the low points of a triple of the first type. Those points at which at least three side surfaces of at least three different adjacent triples, or the planes spanned by these side surfaces intersect, are referred to as low points. There, a cavity provided in the triple of the first type is partially filled with material. In this case, all three side surfaces of the triples of the second type then interact with one another, because the triples of the second type have the same index of refraction as the material of the retroreflector.

A preferred production method of a retroreflector according to the invention is the injection-molding method. A master is used for the injection-molding method, which master can be galvanically molded from an original mold. The injection-molding mold is a negative of the retroreflector according to the invention; the original mold can be a positive of the retroreflector according to the invention. The injection-molding mold has the same basic structure as the retroreflector according to the invention. The injection-molding mold therefore also has a regular arrangement of multiple reflective triples of the first type, each having three side surfaces. The side surfaces are disposed in cube-like manner. In order for the side surfaces of the retroreflector to stand approximately perpendicular to one another, the side surfaces of the injection-molding mold also have to stand approximately perpendicular to one another. Side surfaces that enclose an angle between 87° and 93°, preferably between 89° 50' and 90° 10' between one another are considered to be standing approximately perpendicular to one another.

In order to form recesses in the apex of the reflector, which recesses form triples of the second type, there are elevations in the negative injection-molding mold at a low point.

A further possibility for the production of a retroreflector according to the invention is 3D printing. In this regard, the material for 3D printing must be transparent for the desired wavelength range.

The following advantageous further developments can be used, without restriction of the generality of the invention, both for the tool and for the retroreflector.

According to a possible embodiment, the triples of the second type are cuboid-shaped. For example, the triples have a rectangular base surface and a long edge that extends over the entire edge length of the assigned triple of the first type.

The orientation of the triples of the second type can also be varied, depending on the desired angle distribution of these triples. On the one hand, the orientation can take place in such a manner that the edges of the triples of the second type run parallel to the edges of the related triples of the first type. This orientation is advantageous for applications without angle widening. On the other hand, the triples of the second type can also be tilted relative to the triples of the first type. As a result, at least one edge of the triple of the second type encloses an angle not equal to 0° or 180° relative to the corresponding edge of the triple of the first type. In this regard, tilting angles of a few arc minutes, for example for wide-angle functions, are just as conceivable as tilting in an angle range of multiple degrees, for example for security applications.

In the case of security applications, those triples of the first type in which a triple of the second type is provided can be selected according to a predetermined pattern. The pattern then appears on the retroreflector according to the invention. The pattern can have the form of a text, for example.

Suitable materials for the production of a retroreflector according to the invention are all materials that are transparent in the desired wavelength range. For example, the materials polymethyl methacrylate (PMMA), polycarbonate (PC) or an optical silicone (liquid silicone rubber) are possible materials.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
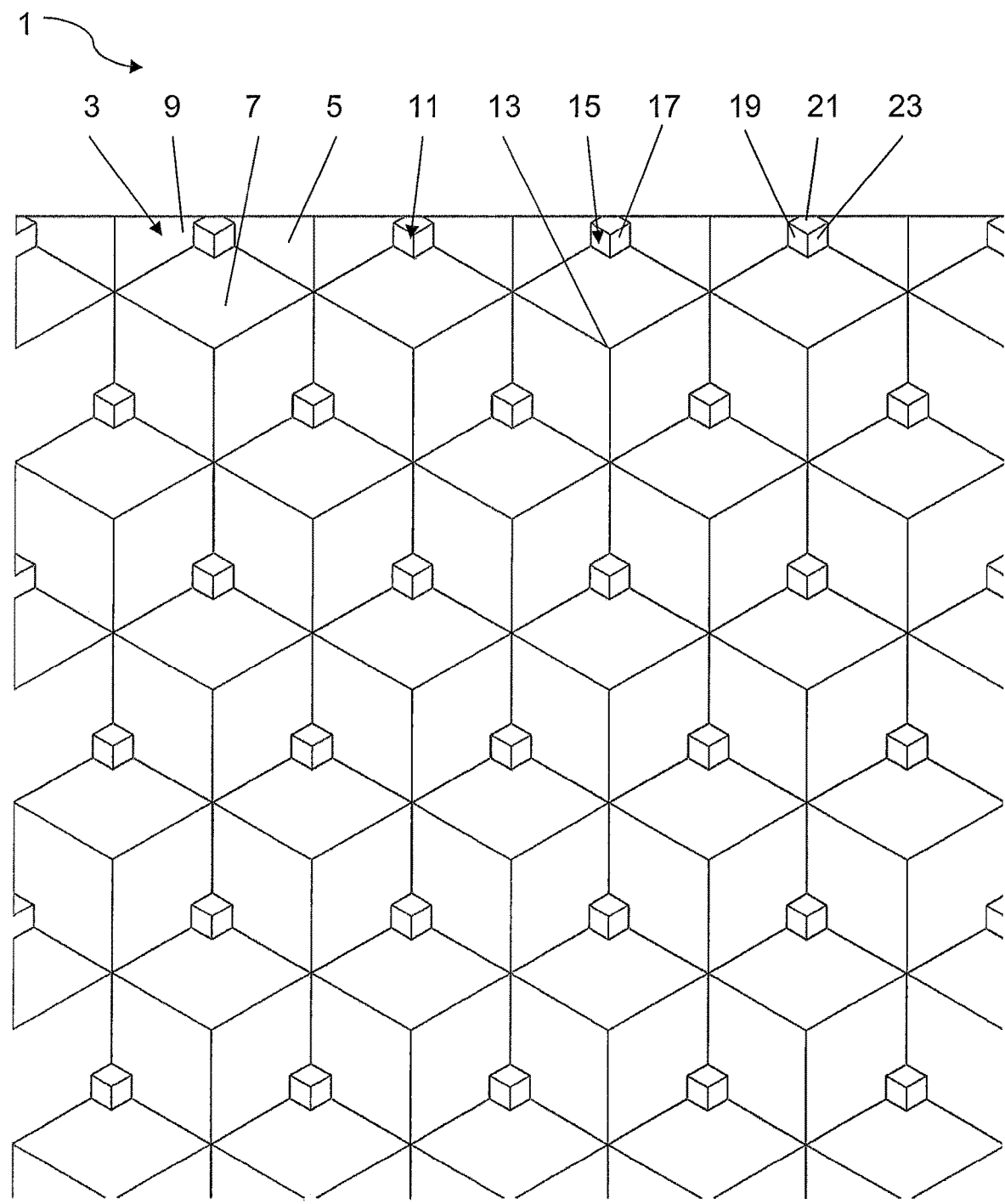
FIG. 1 shows the structure of a retroreflector according to the invention in a hexagonal basic shape.

FIG. 1 shows the structure of a retroreflector 1 according to the invention, with a regular arrangement of triples of the first type 3. In FIG. 1, an arrangement having a hexagonal Full Cube geometry is shown. The invention, however, can also be implemented in other geometries, such as the pyramid structure or the Gubela triple geometry. Every triple of the first type has three side surfaces of the first type, namely a first side surface 5, a second side surface 7, and a third side surface 9. The side surfaces of the first type 5, 7, 9 stand approximately perpendicular to one another, in pairs, in other words in an angle range between 87° and 93°, preferably in an angle range between 89° 50' and 90° 10'. The planes spanned by the side surfaces of the first type 5, 7, 9 intersect at an apex 11.

A cube-shaped recess 15 is provided at the apex 11 of each triple of the first type 3. This recess 15 forms a triple of the second type 17. Each of the triples of the second type 17 has three side surfaces of the second type 19, 21, 23, which stand approximately perpendicular to one another, in pairs. In particular, the first side surface 19 of the triple of the second type 17 is approximately parallel to the first side surface 5 of the corresponding triple of the first type 3; the second side surface 21 of the triple of the second type 17 is approximately parallel to the corresponding second side surface 7, and the third side surface 23 of the triple of the second type 17 is approximately parallel to the corresponding third side surface 9 of the triple of the first type 3. Approximately parallel means that the side surfaces or their imaginary extensions would intersect at an angle of less than 1°, preferably less than 10'.

At the low points 13, at which three adjacent triples of the first type 3 touch one another, no further structures are provided in the exemplary embodiment of FIG. 1.

Figure 2:
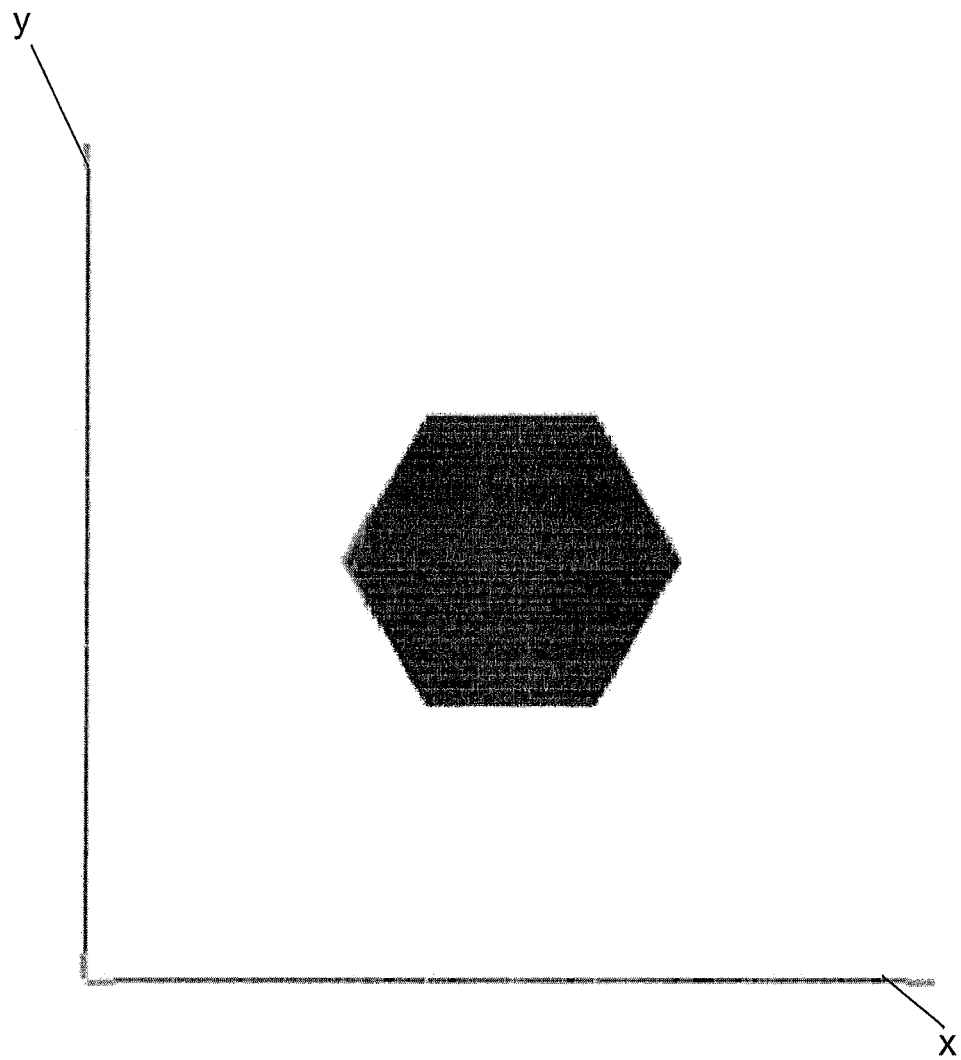
FIG. 2 shows a reflection image of the structure according to FIG. 1.

FIG. 2 shows the reflection image of a single triple of a retroreflector from FIG. 1 in the local-resolution near field. In this regard, the axes x and y are perpendicular to the optical main axis, not shown. The hexagonal structure of the retroreflector can be clearly recognized, and reflection takes place homogeneously over the entire filled surface.

Figure 3:
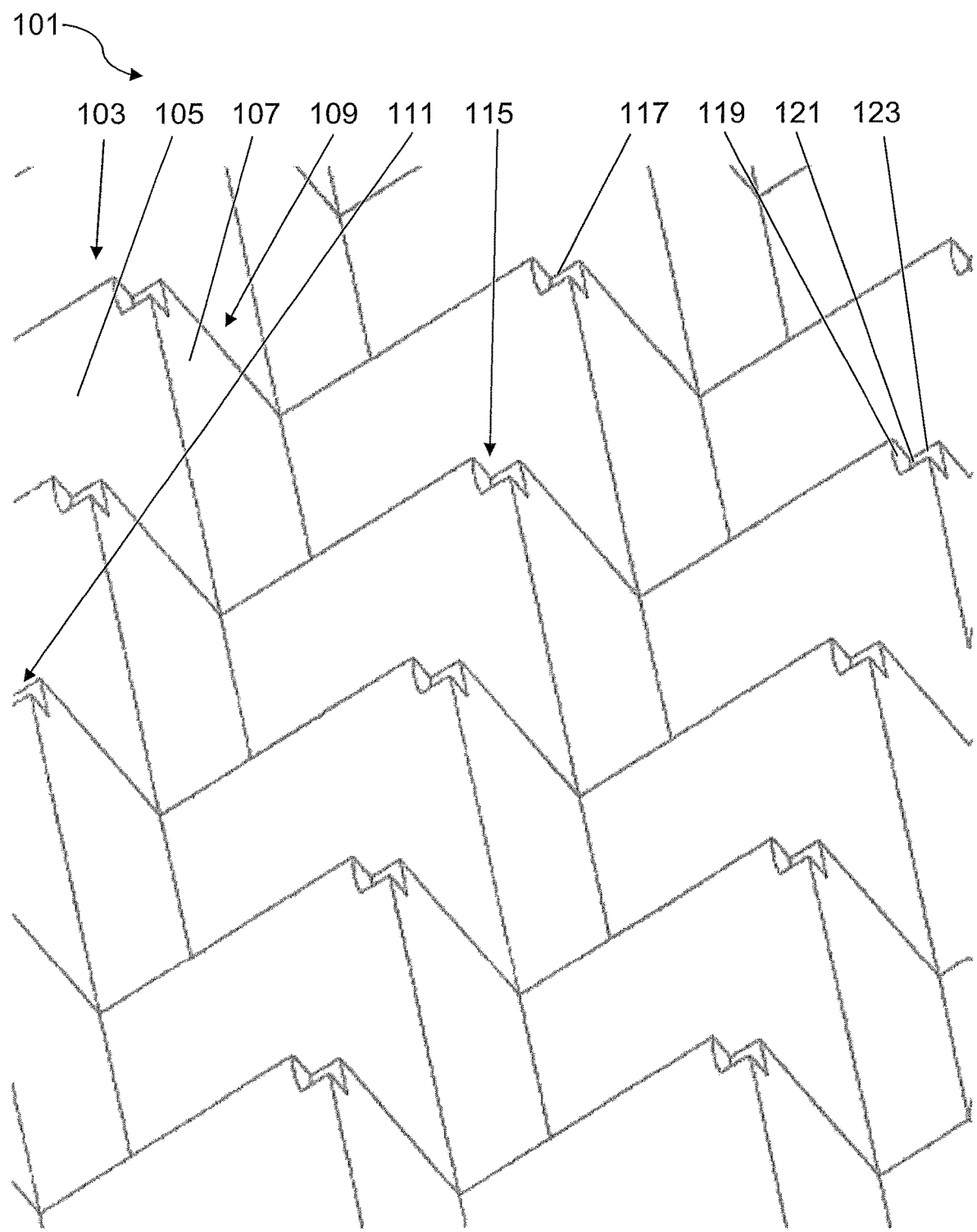
FIG. 3 shows a modification of a retroreflector according to the invention according to FIG. 1.

FIG. 3 shows a first modification of a retroreflector 101 according to the invention. The triples of the first type 103, like the triples from FIG. 1, have a cubical shape with three side surfaces of the first type 105, 107, 109. At the apex 111 of each triple, once again a recess 115 is provided. This recess 115 forms a triple of the second type 117 having three side surfaces of the second type 119, 121, 123, which stand almost perpendicular to one another. In contrast to the retroreflector 1 according to the embodiment according to FIG. 1, however, the side surface 119 has a curved surface. This curved surface ensures a straight line in the reflection image. In the case of two curved side surfaces of the triples of the second type 117, the reflection image would have the shape of a cross.

Figure 4:
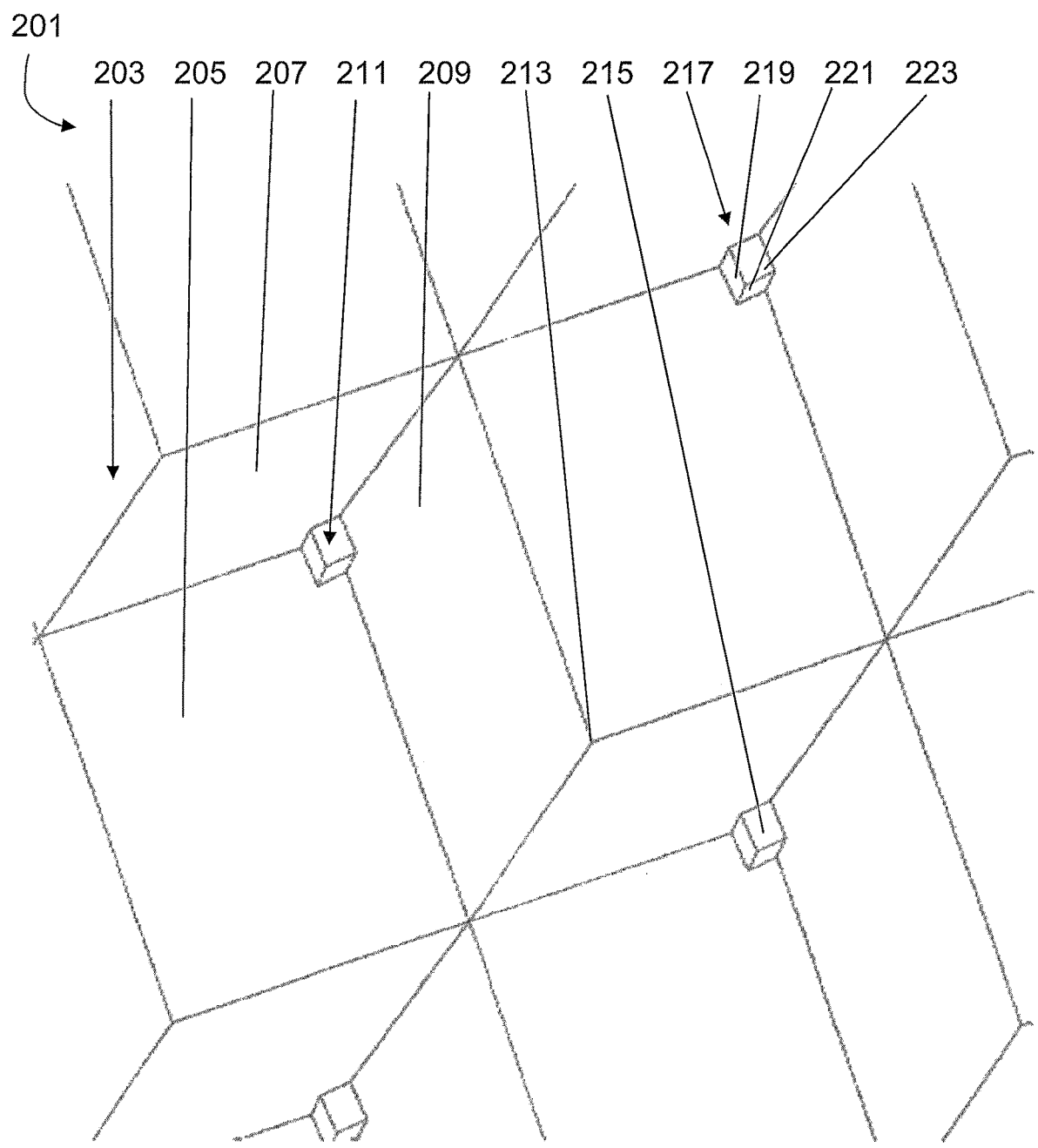
FIG. 4 shows a further modification of a retroreflector according to the invention according to FIG. 1.

FIG. 4 shows a second modification of a retroreflector 201 according to the invention, with a regular arrangement of triples of the first type 203, which each have three side surfaces of the first type 205, 207, 209, which stand almost perpendicular to one another. At the apex 211 of the triples, once again recesses 215 are provided, which form triples of the second type. The triples of the second type are rotated by an angle, in comparison with the orientation according to FIG. 1, about an axis that runs through the apex 211 and extends along a normal line relative to a light entry surface of the retroreflector 201, not shown.

Figure 5:
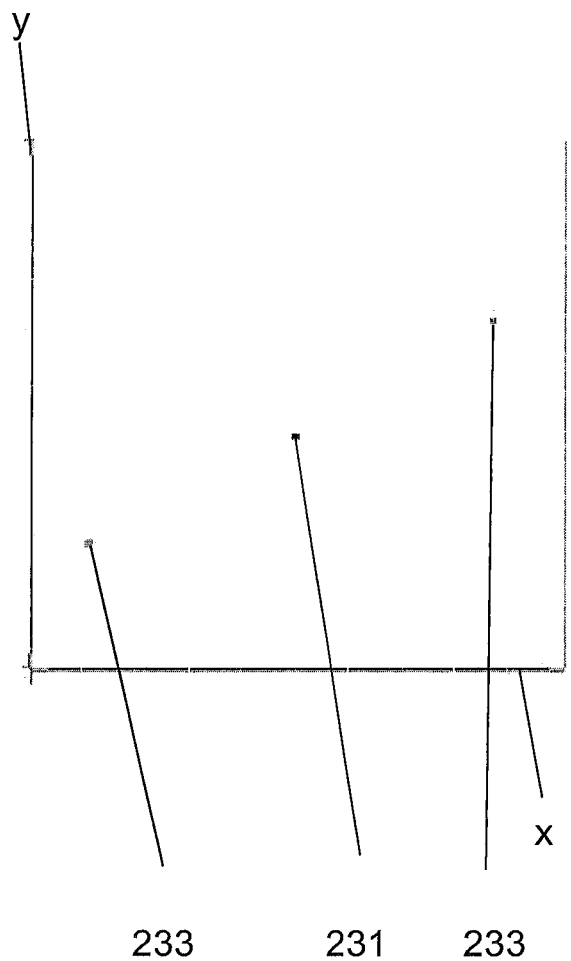
FIG. 5 shows the reflection pattern of a retroreflector according to FIG. 4.

FIG. 5 shows a reflection image of the retroreflector 201 according to FIG. 4. The large triples of the first type cause an intensive main reflection point 231. The main reflection point 231 lies precisely in the retroreflection axis. The triples of the second type, of which each side surface of the second type interacts with two other side surfaces of the triples of the first type, and encloses an angle unequal to 90° relative to the side surfaces of the triples of the first type, cause two secondary reflection points 233 that are weaker in terms of light. The secondary reflection points 233 are displaced both along the X axis x and along the Y axis y, and have a symmetry center at the origin, or at the main reflection point 233. This reflection image of the secondary reflection points corresponds to the image of a small retroreflector, in which two side surfaces enclose an angle not precisely equal to 90°, but form a precise right angle relative to a third side surface (cf., for example, P. R. Yoder in "Study of light deviation errors in triple mirrors and tetrahedral prisms," Journal of the Optical Society of America, Vol. 48, No. 7, July 1958).

Figure 6:
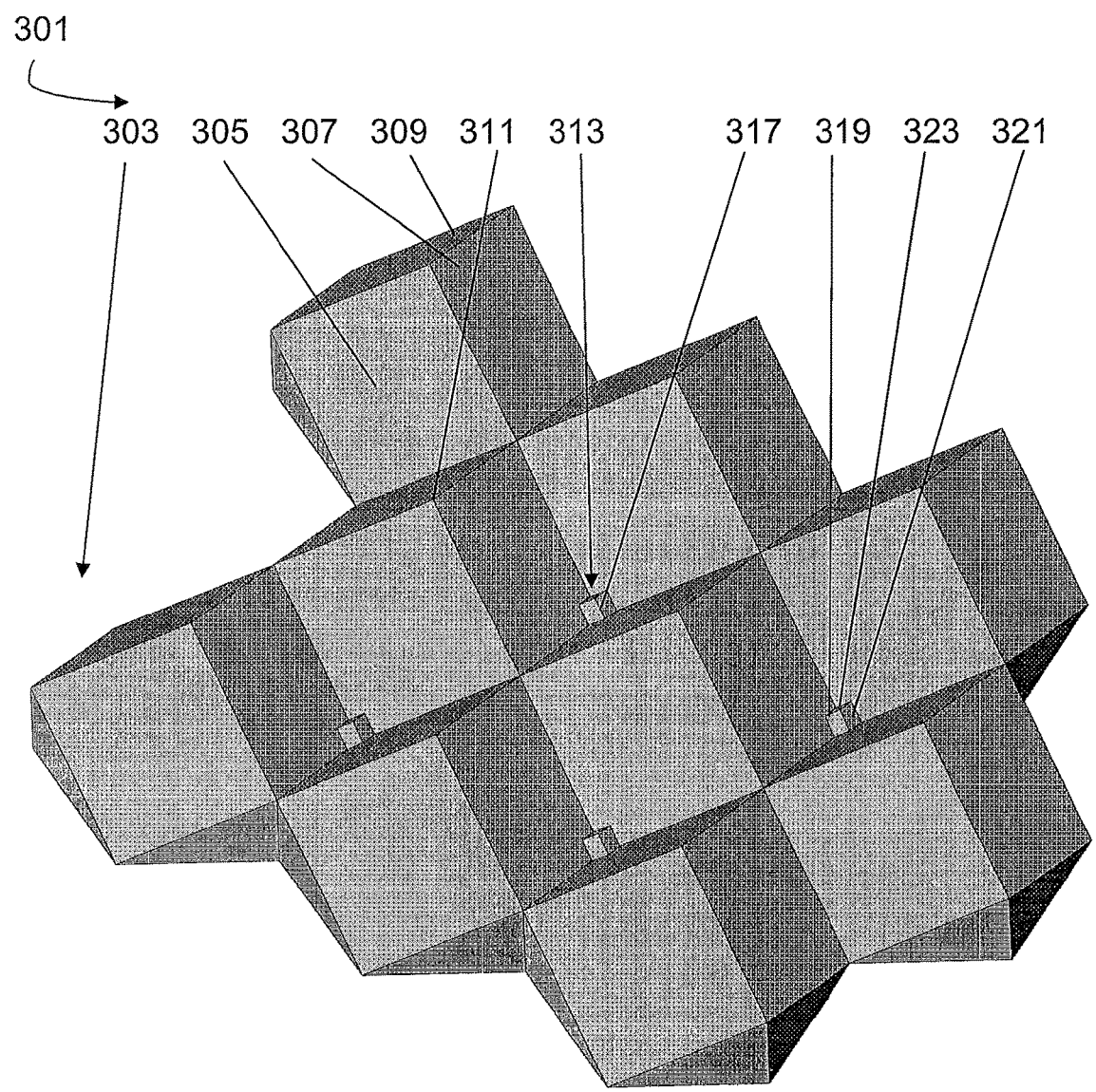
FIG. 6 shows the structure of a retroreflector according to the invention in a hexagonal basic shape, with the triples of the second type at the low points.

FIG. 6 shows an embodiment of a retroreflector 301 according to the invention, in which the triples of the second type 317 are provided as elevations at the low points 313 of the triples of the first type 303, which elevations project out of the planes spanned by the side surfaces of the first type. The side surfaces 305, 307, 309 of the triple of the first type 303 run parallel to the corresponding side surfaces 319, 321, 323 of the triple of the second type 317. In this exemplary embodiment, the side surfaces 319, 321, 323 of the triples of the second type 317 can also interact with one another. As a result, reflected light that is radiated into a region of the retroreflector 301 having triples of the second type impacts three side surfaces of a triple of the second type on its light path during retroreflection, instead of two side surfaces of a triple of the first type and a side surface of a triple of the second type, as in the case of the previous exemplary embodiments. This feature results because the triples of the second type are filled with material and therefore have the same index of refraction as the triples of the first type.

Figure 7:
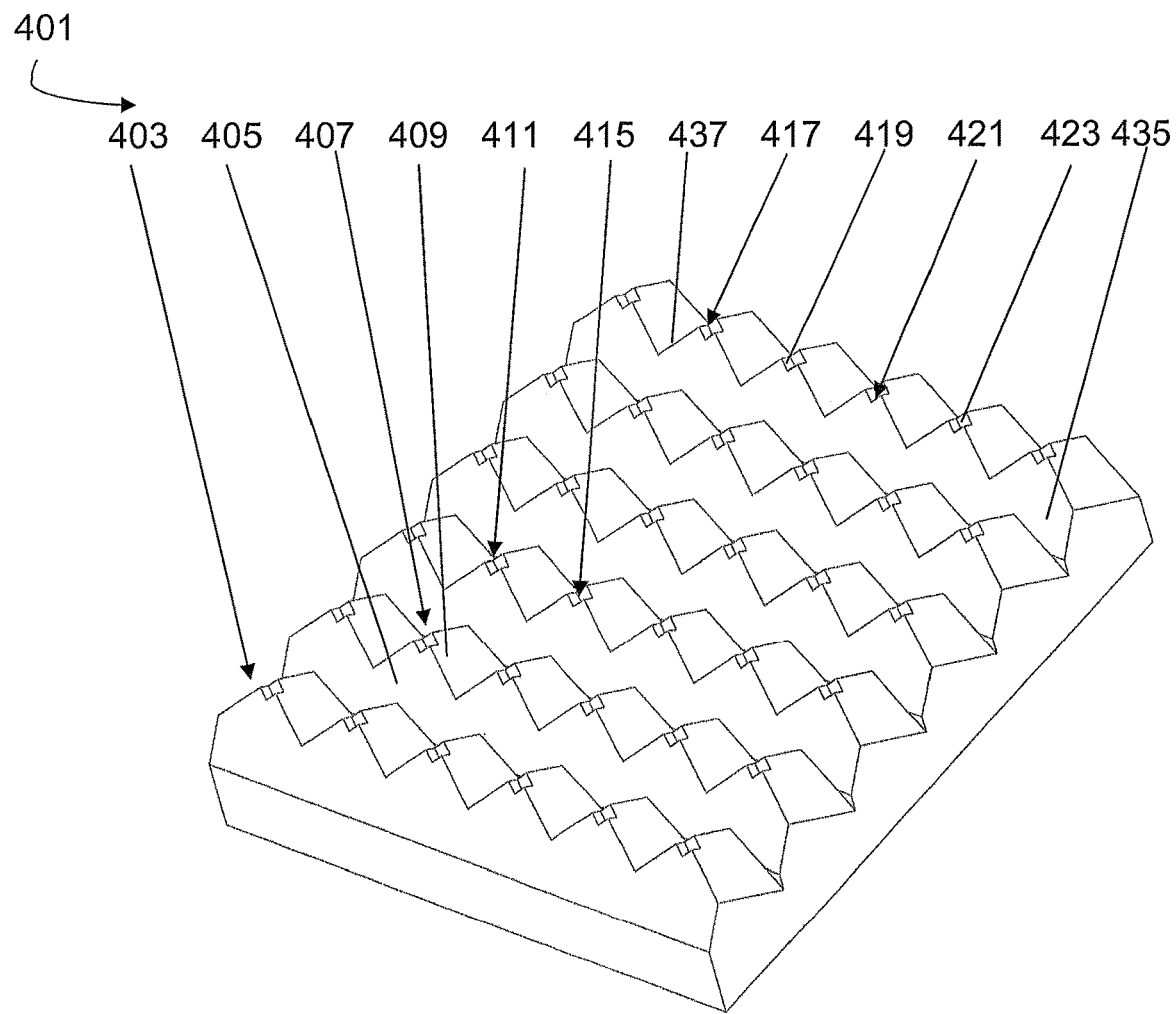
FIG. 7 shows the structure of a retroreflector according to the invention in a further geometry having a rectangular basic surface.

FIG. 7 shows a retroreflector 401 according to the invention, in the Gubela triple geometry, in other words a geometry having a rectangular base surface.

A side surface 405 of the triples of the first type 403 is defined by the main groove 435 of the geometry. The side surfaces 407 and 409 are formed by two parallel secondary grooves 437. In the Gubela triple geometry, the triples of the second type 417 can be formed, as shown, by recesses 415 at the apex 411, or at a lower end, in other words an end of the secondary grooves facing a light entry surface of the retroreflector, as cuboid-shaped elevations. In the embodiment according to FIG. 7, the variations of the side surfaces 419, 421, 423 of the triples of the second type 417 shown in the previous figures are also possible.

Figure 8:
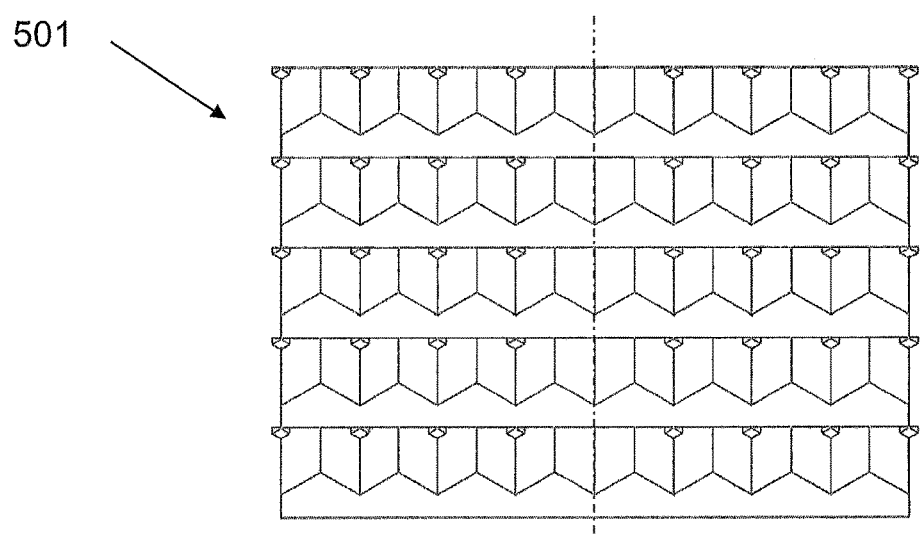
FIG. 8 shows the structure in the geometry according to FIG. 7 with the triples of the second type at the low points of the geometry, in a view from above.
Figure 9:
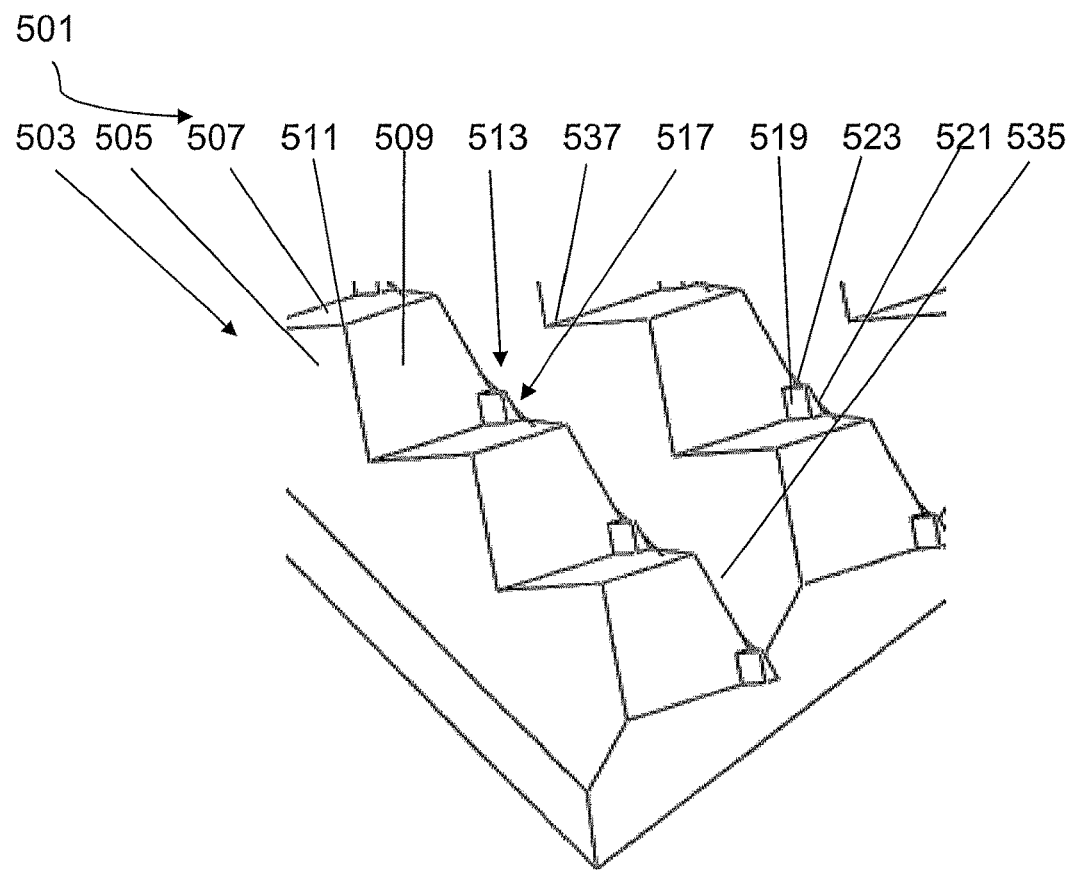
FIG. 9 shows the structure according to FIG. 8 in a second view.

FIGS. 8 and 9 show two views of a further embodiment of a retroreflector 501 according to the invention, in the geometry having a rectangular base surface. In this regard, FIG. 8 shows a view from above, and FIG. 9 shows a perspective view. The triples of the second type 517 are situated at the low points 513 as elevations, in other words at a lower end of the secondary grooves 537. The side surfaces 519, 521, 523 of the triple of the second type 517 are oriented parallel to the corresponding side surfaces 505, 507, 509 of the triple of the first type 503, in each instance. In particular, the first side surface 519 follows the boundary surface of the main groove 535 in terms of its orientation.

Figure 10:
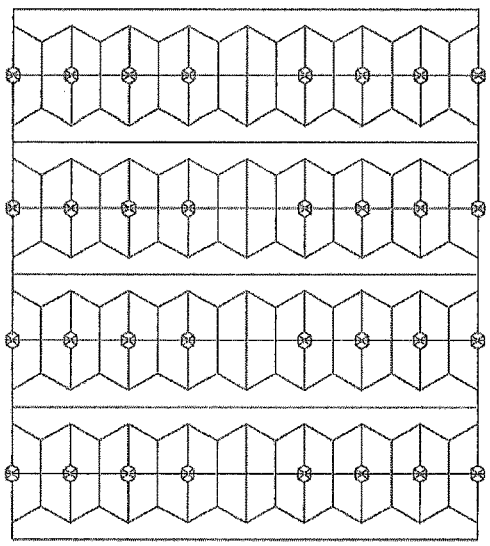
FIGS. 10 and 11 show a similar structure as in FIG. 8, with strands reflected relative to one another.
Figure 11:
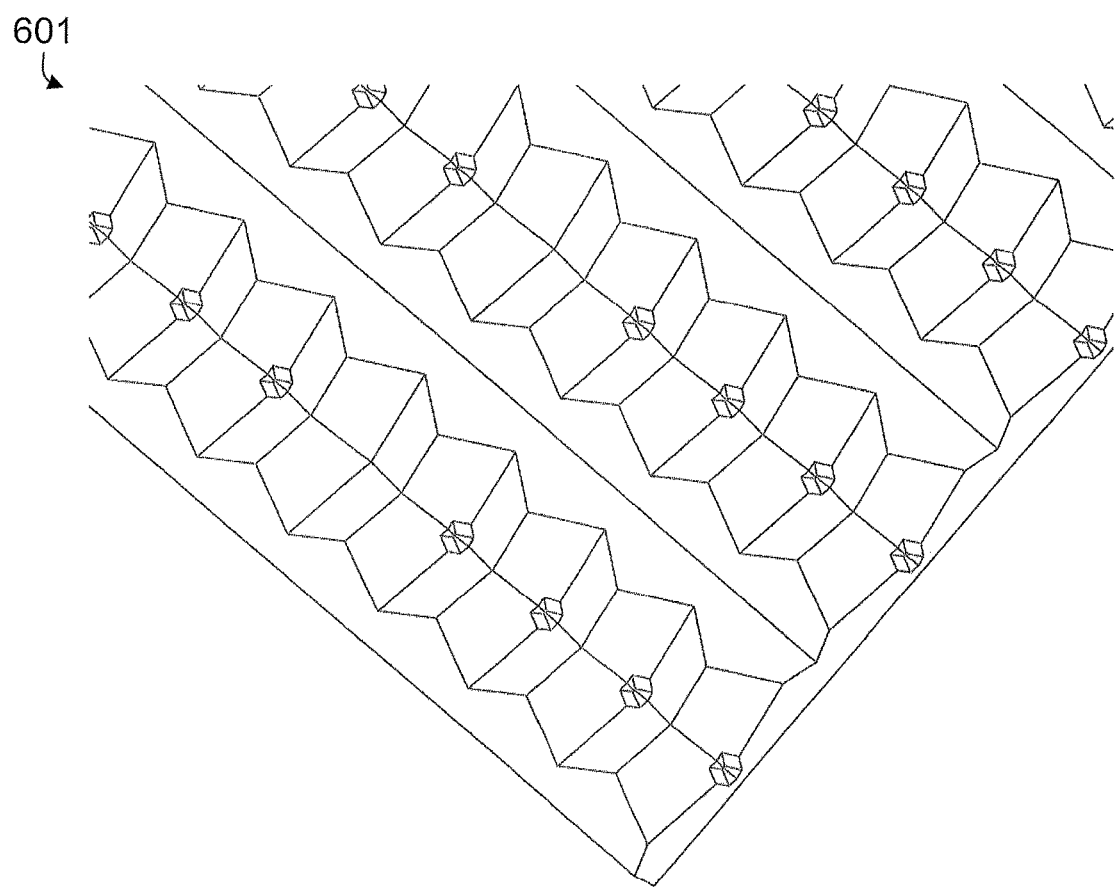

The embodiment of the retroreflector 601 according to FIGS. 10 and 11 is based on the previous embodiment. In this regard, however, two adjacent strands, in each instance, are rotated relative to one another by 180°. In this regard, the shape of two joined triples of the second type, in each instance, comes out to two cuboids cut off at a slant, which are joined together with mirror symmetry at the cut surface.

Figure 12:
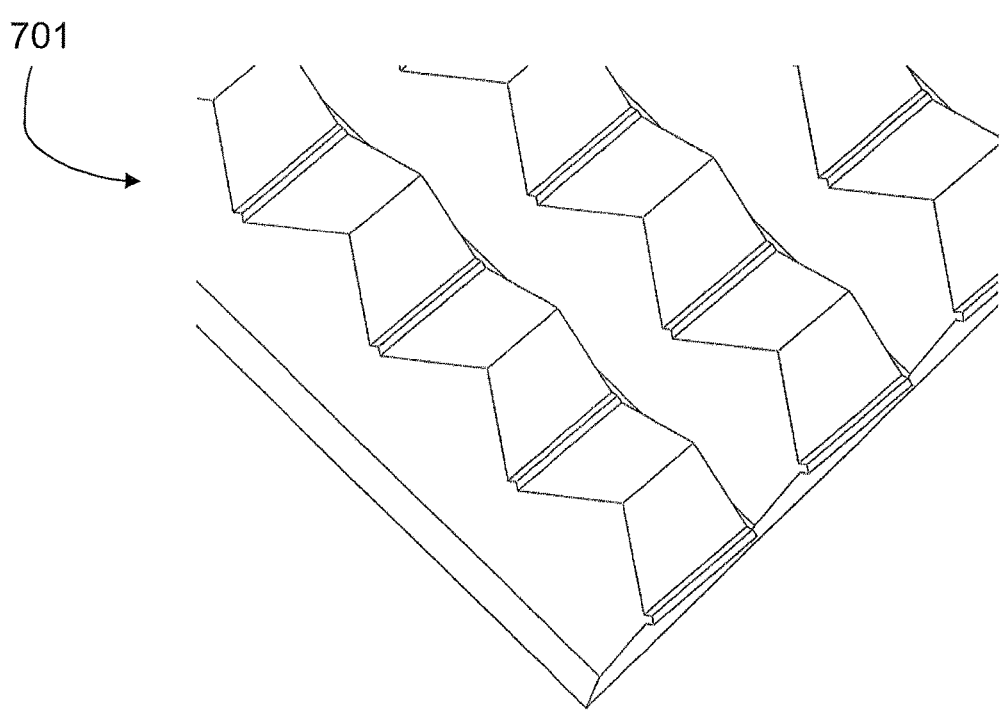
FIG. 12 show the structure according to FIG. 8, in which the triples of the second type extend over the entire vertex of the secondary grooves.

FIG. 12 shows a retroreflector 701, in which the triple of the second type extends over the entire vertex of the secondary groove.

Figure 13:
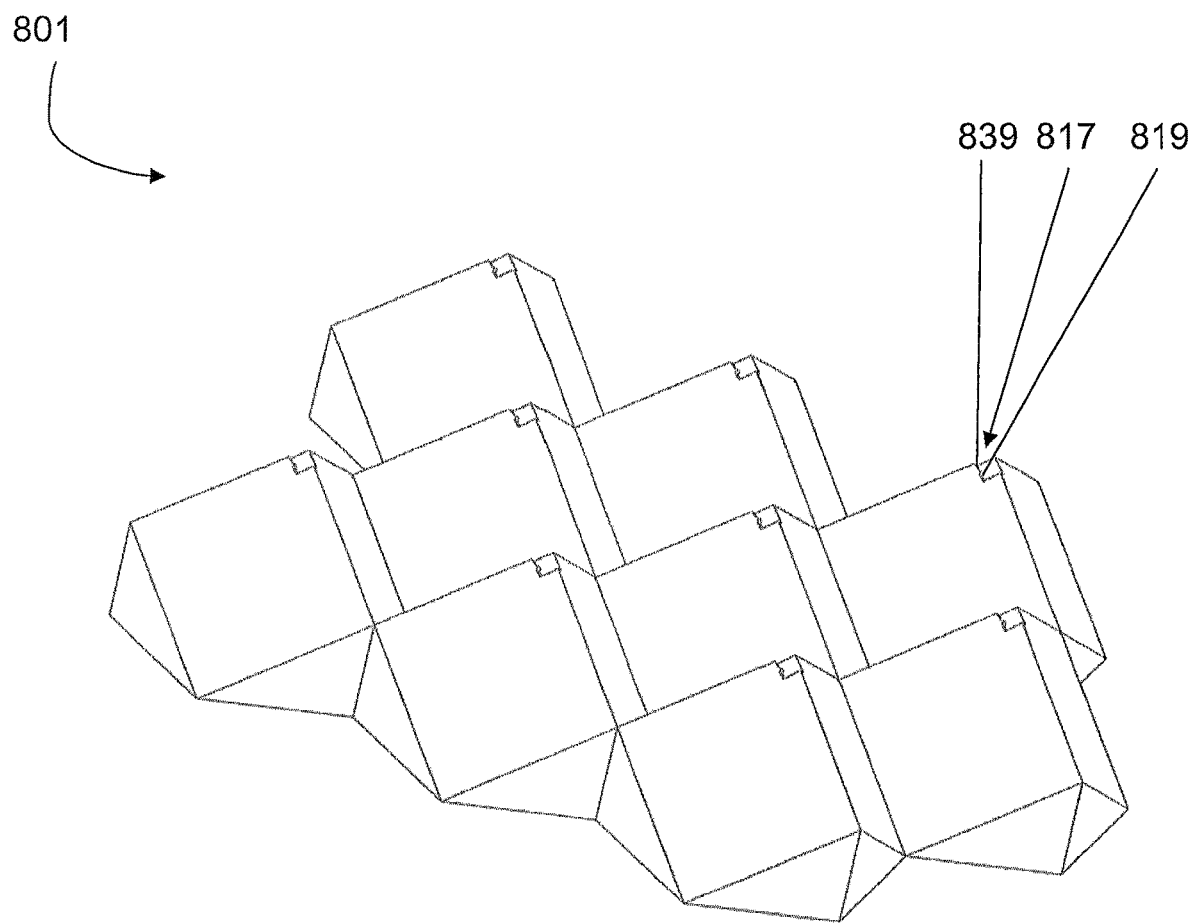
FIG. 13 show a retroreflector according to the invention with optical microstructures on a side surface of a triple of the second type.

FIG. 13 shows an embodiment of a retroreflector 801 according to the invention, with optical structures 839 in the form of cylindrical lenses, which are affixed on a first side surface 819 of a triple of the second type. The optical structure 839 takes up only a fraction of less than a third of the surface content of the first side surface 819 of the triple of the second type 817 in this example.

Figure 14:
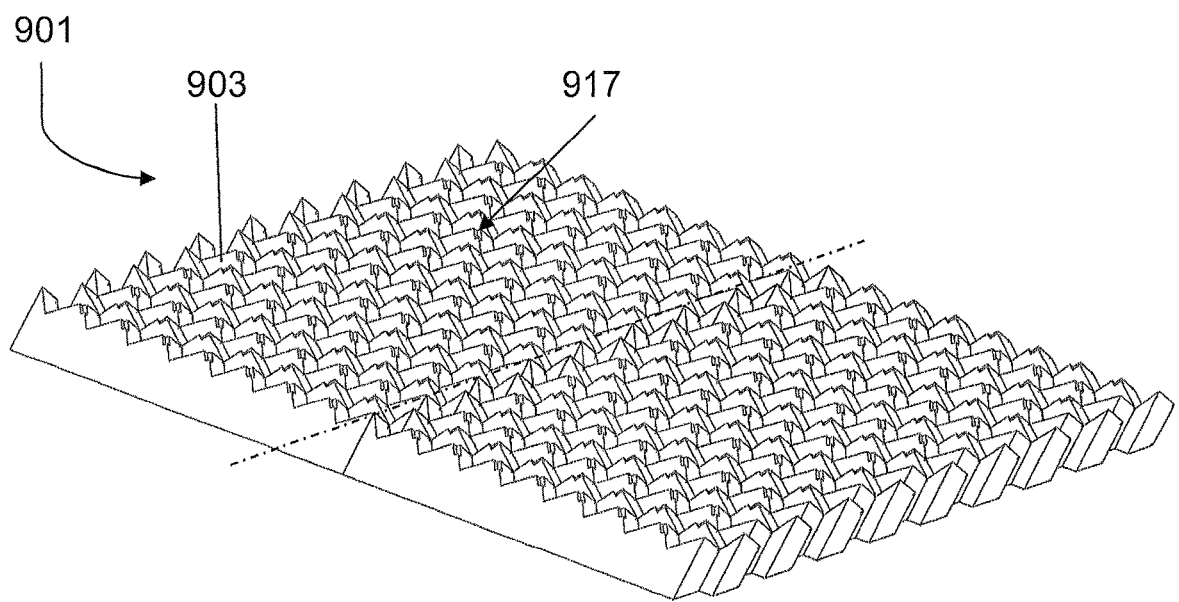
FIGS. 14 and 15 show two views of a wide-angle retroreflector with triples of the second type at the point.
Figure 15:
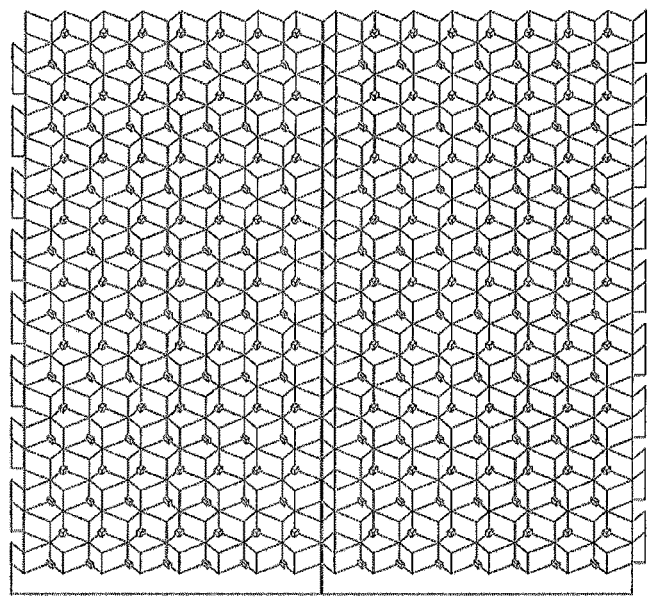

FIGS. 14 and 15 show two views of an embodiment of a retroreflector 901 according to the invention, in which the basic shape represents a wide-angle mirror structure described in DE 102 165 79 A1, at the apex of which the triples of the second type 917 are formed as recesses. The orientation of the triples of the second type 917 can further reinforce the wide-angle property of the retroreflector 901, in addition to supplemental measures, for example a mirror-symmetry arrangement of the triples of the first type 903.

Figure 16:
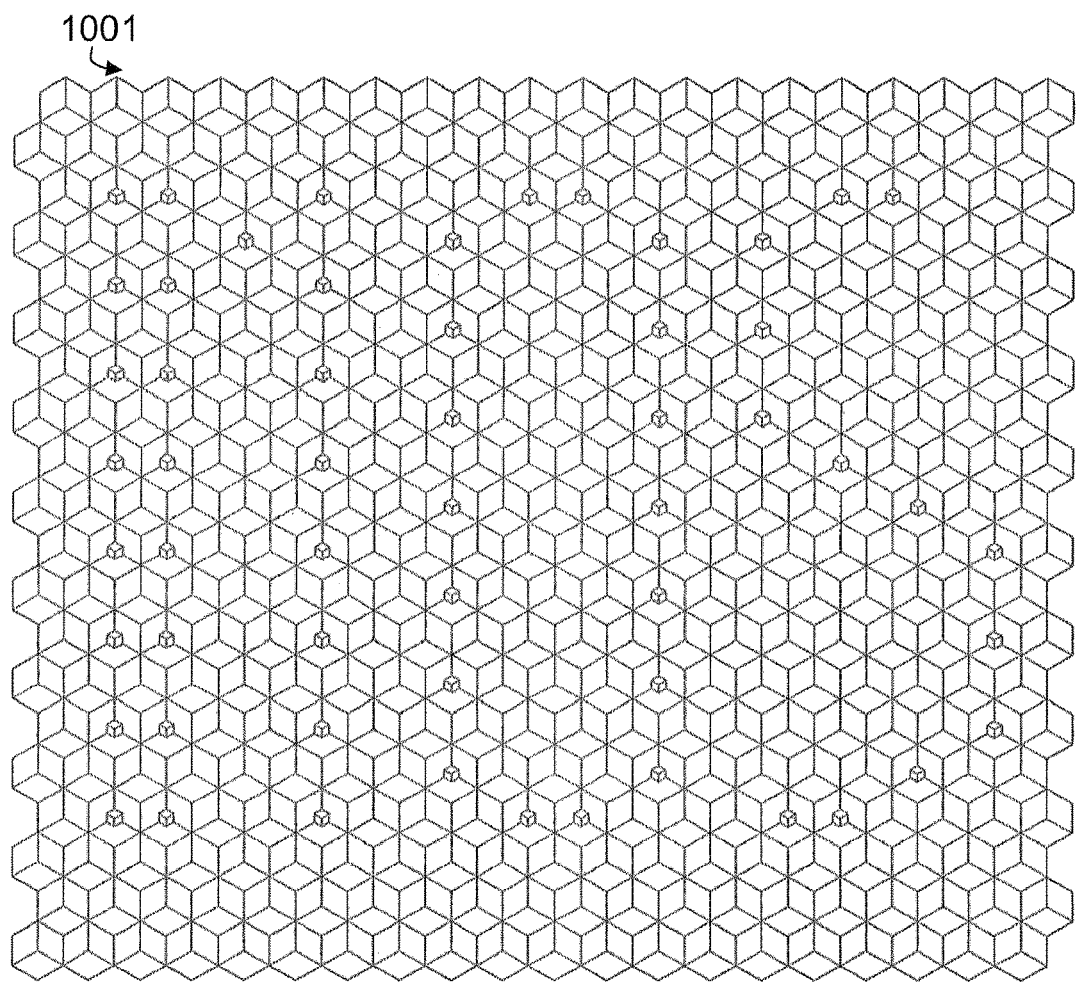
FIG. 16 shows a structure of a retroreflector according to the invention, in which the triples of the second type form a pattern.

FIG. 16 show a retroreflector 1001, the triples of the second type of which are arranged in such a manner that they form the writing "IMOS." Here, the triples of the second type are structured throughout as a recess in the apex, with their side surfaces parallel to one of the side surfaces of the triples of the first type, in each instance. The arrangement of the triples of the second type, however, can be combined in any desired manner with other embodiments presented here. The arrangement of the triples of the second type in a pattern is particularly suitable, due to the specific reflection image, for forming a security element to increase the security against forgery of documents.

Figure 17:
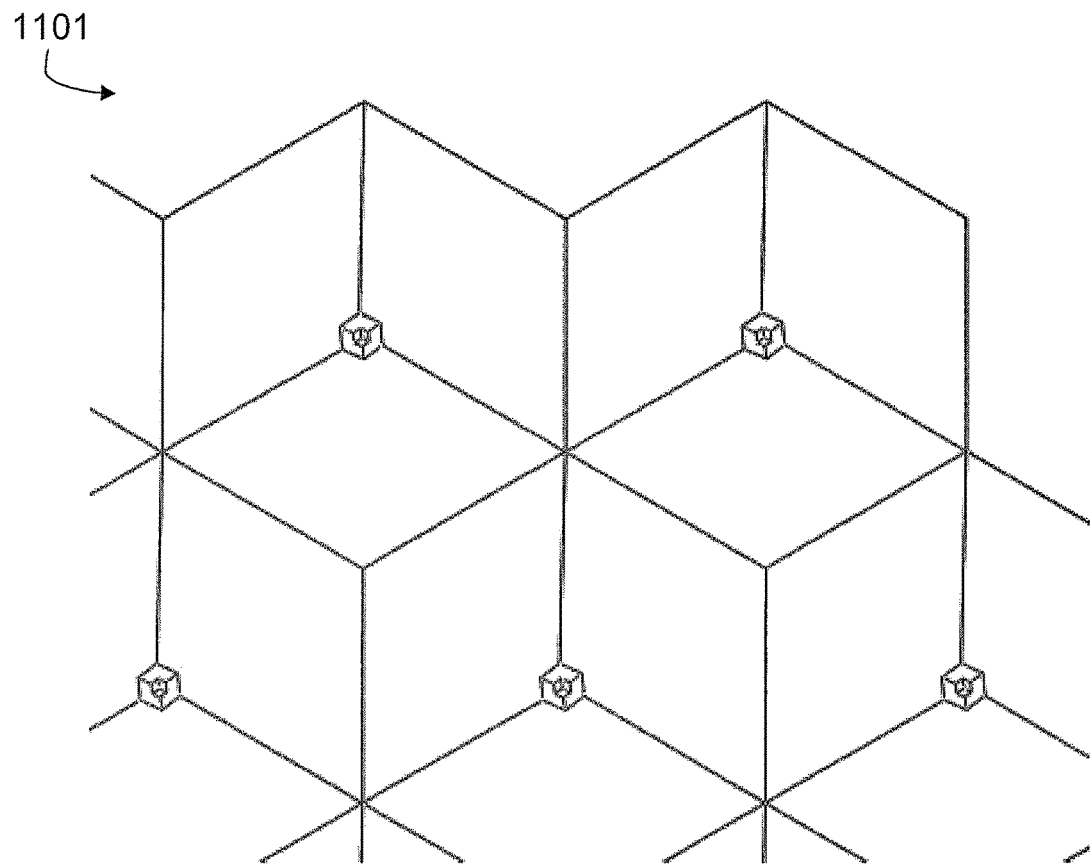
FIG. 17 shows a further plane of the nesting.

FIG. 17 shows a retroreflector 1101 as an example, in which triples of a third type are provided in the triples of the second type, which are configured as recesses. The triples of the third type in turn are configured as elevations, which project out of the side surfaces of the second type. This arrangement can be continued as desired, theoretically, so that a fractal-like structure is formed. Refraction effects become more and more clearly evident, however, as structures become smaller. Furthermore, clearly fewer light beams impact the triples of the third type than the triples of the first type, so that the optical effects of these structures are very small as compared with the primary effects of the triples of the first type. Alternatively, it is possible to select elevations at low points as triples of the second type, in the apices of which recesses are then provided as triples of the third type.

Figure 18:
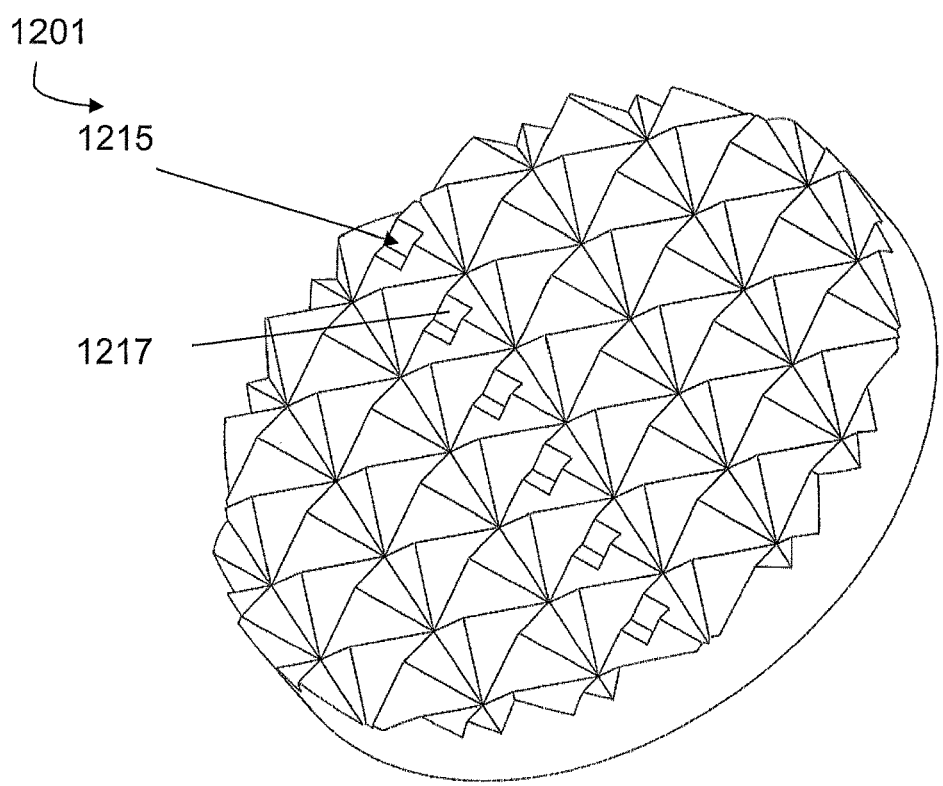
FIG. 18 shows a structure of a retroreflector according to the invention in the pyramid geometry.

FIG. 18 shows a retroreflector 1201, in which the triples of the first type consist of tetrahedrons. The reflector therefore has a pyramidal geometry. By means of the cuboid-shaped recess 1215 of the triples of the second type 1217, three intersecting smaller pyramids are formed from a pyramid tip.

Figure 19:
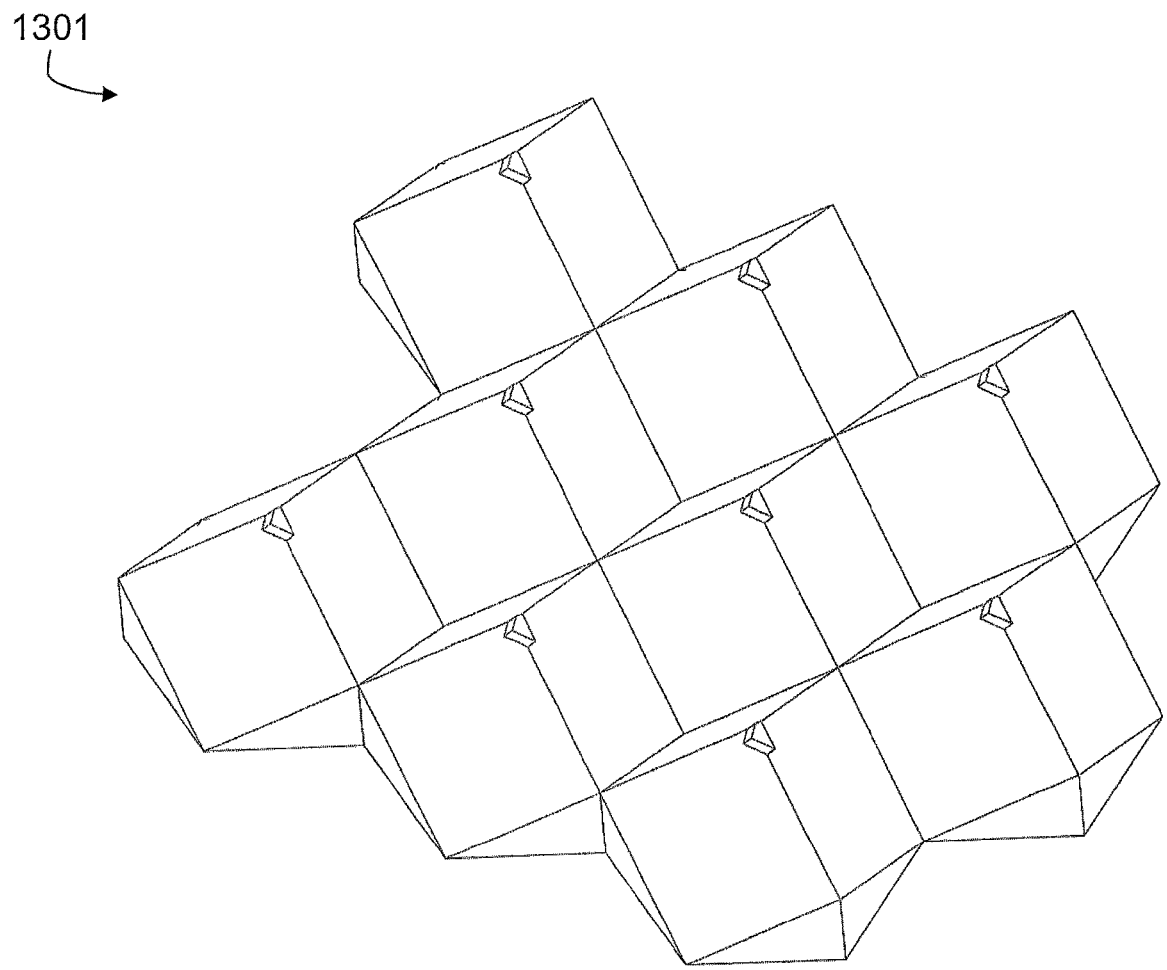
FIG. 19 shows an arrangement in which a part of the beam is deflected in a different direction, but the major portion of the light is retroreflected.

FIG. 19 shows a retroreflector 1301, in which the triples of the second type are tilted so greatly relative to the triples of the first type that the light is deflected at these triples. Most of the light is therefore reflected back into the incidence direction, but the smaller portion of the light, which falls onto the triples of the second type, is deflected in a different direction.

Figure 20:
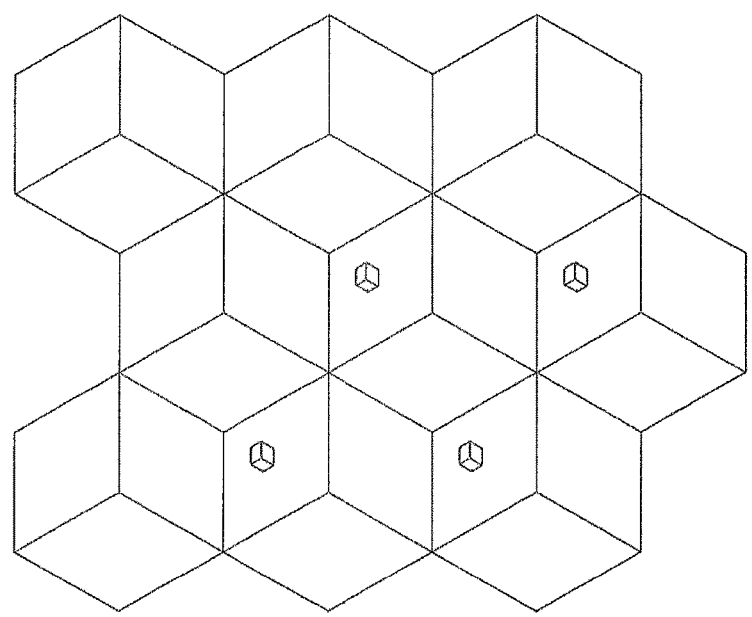
FIG. 20 shows a view from above of a retroreflector structure, in which the triple of the second type is disposed at any desired location of the triple of the first type.
Figure 21:
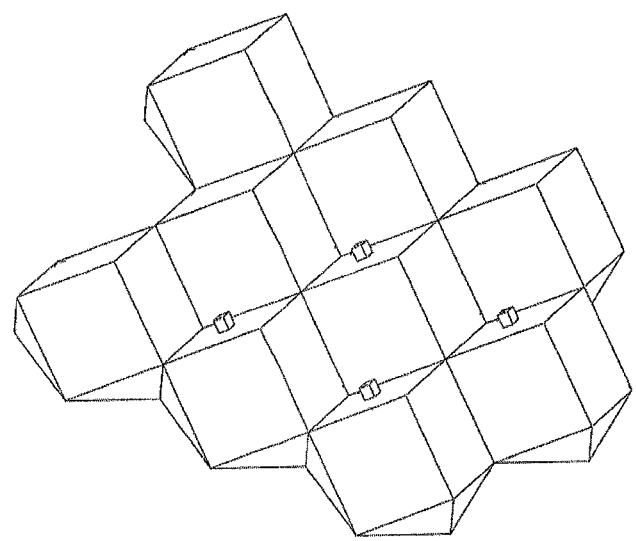
FIG. 21 shows the structure according to FIG. 20 in a further view.

FIGS. 20 and 21 show two views of an embodiment of a retroreflector 1401 according to the invention, in which the triples of the second type are disposed at any desired locations of the triples of the first type, as elevations.

Figure 22:
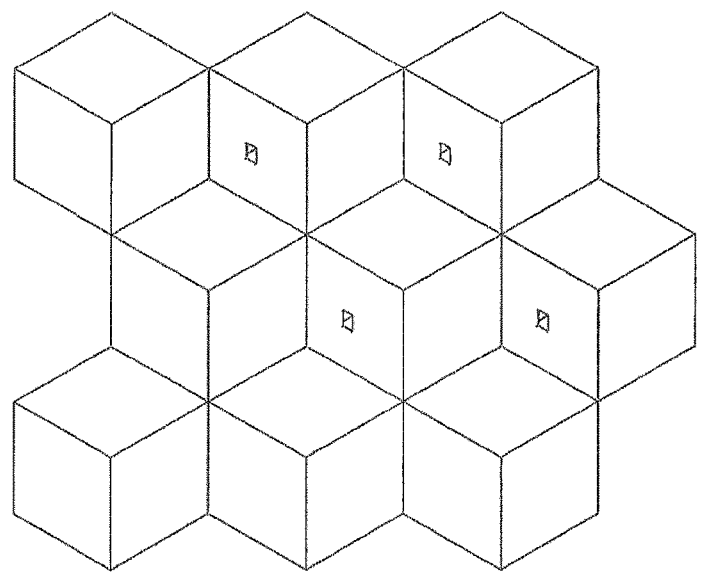
FIG. 22 shows a retroreflector structure similar to that in FIG. 20, in which the triples of the second type are configured as a recess.
Figure 23:
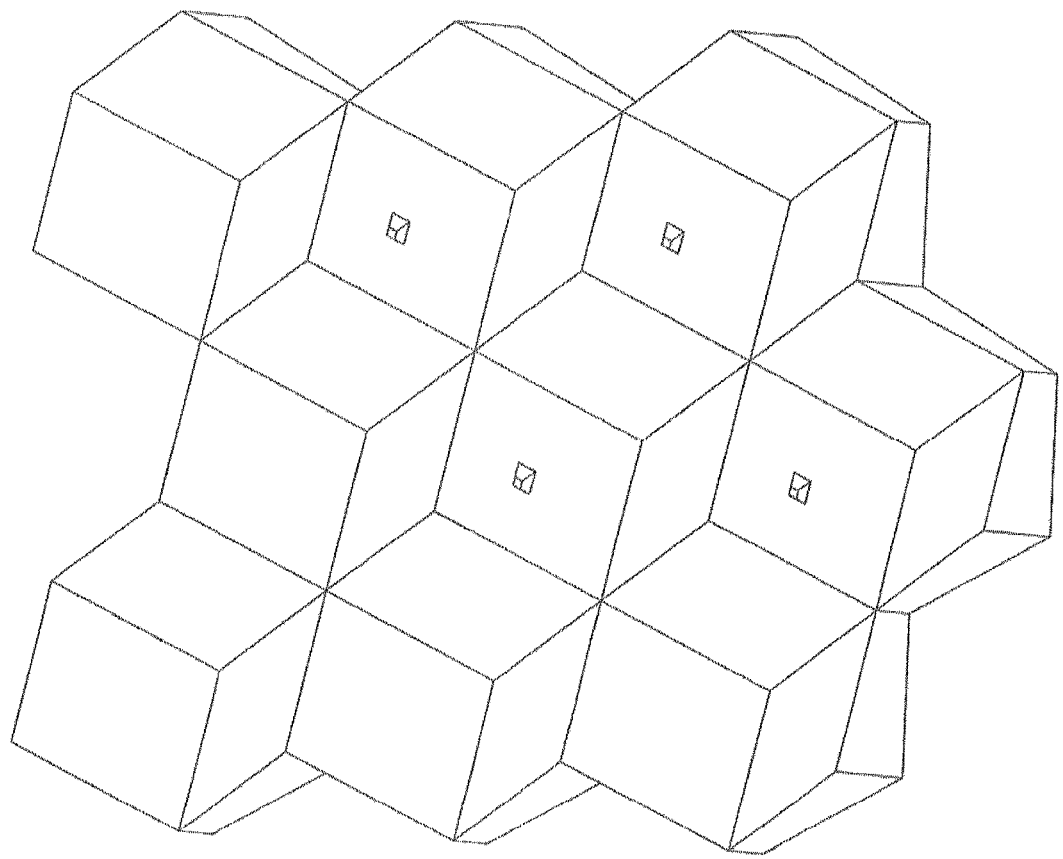
FIG. 23 shows a second view of the structure according to FIG. 22.

FIGS. 22 and 23 show two views of an embodiment of a retroreflector 1501 according to the invention, in which the triples of the second type are disposed at any desired locations of the triples of the first type, as recesses.

Figure 24:
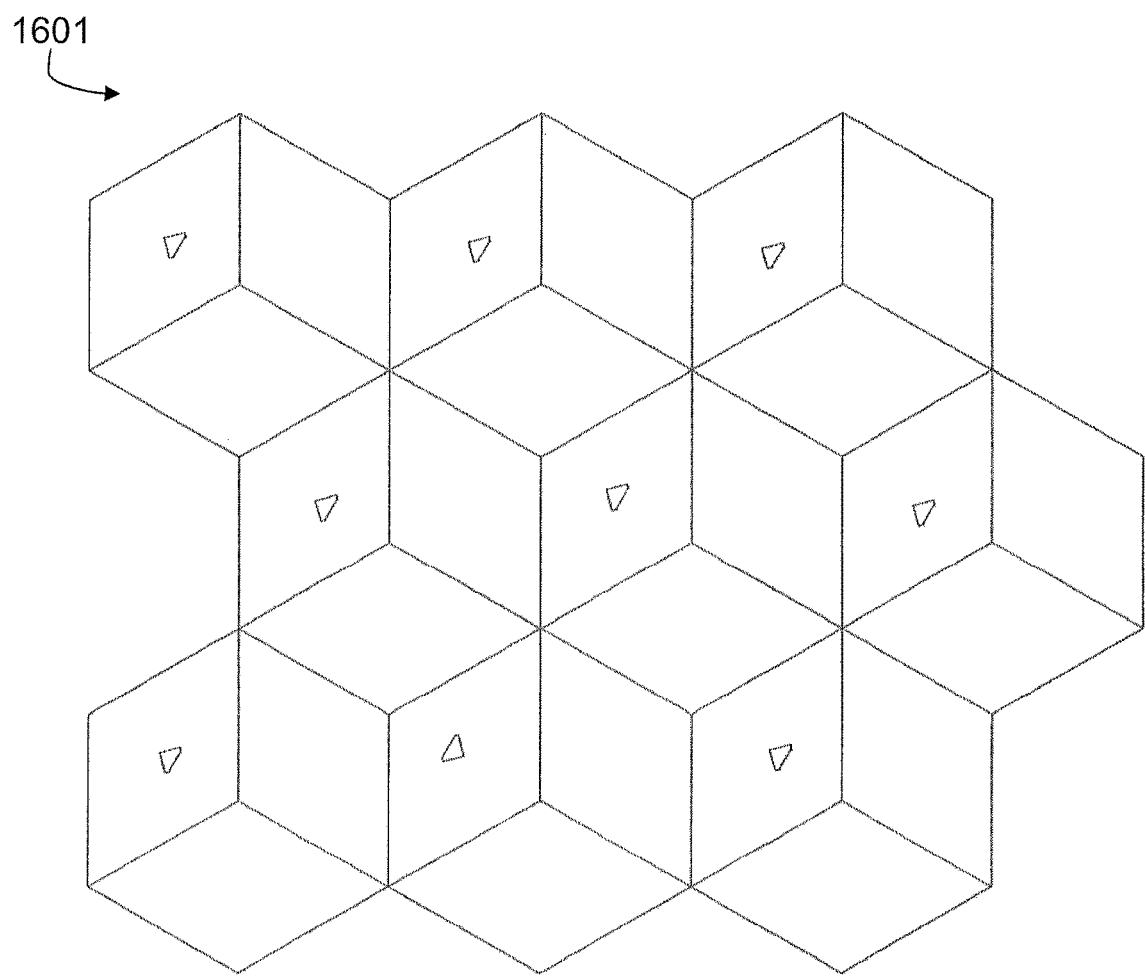
FIG. 24 shows a retroreflector structure in which the recess has the shape of a pyramid as the result of tilting of the cuboid, and is disposed at any desired location.
Figure 25:
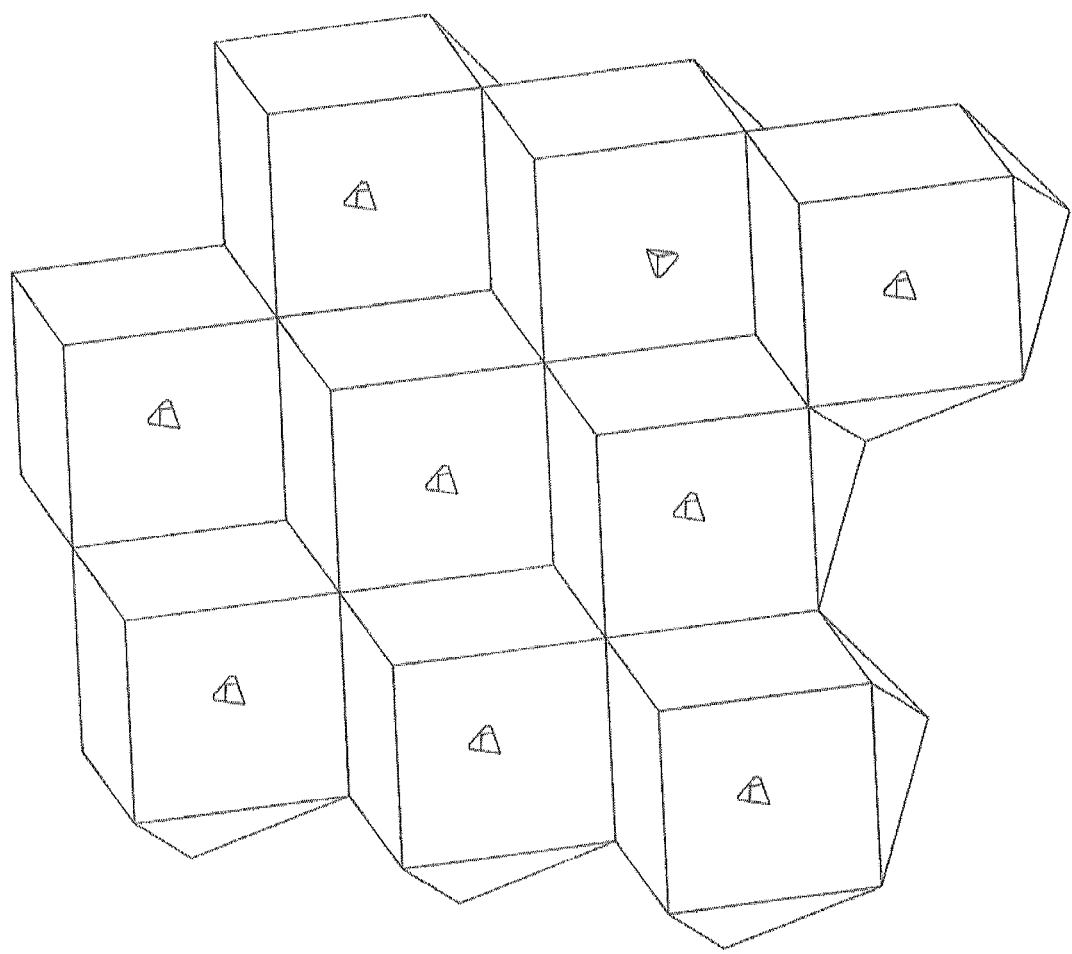
FIG. 25 shows a second view of the retroreflector structure according to FIG. 24.

FIGS. 24 and 25 show two views of an embodiment of a retroreflector 1601 according to the invention, in which the triples of the second type are configured as a recess in the form of a pyramid, or of a cuboid cut off at its diagonal plane, and disposed at any desired location of the triples of the first type.

A person skilled in the art understands that the examples shown can also be combined with one another, without any restriction of generality.

Although only a few embodiments of the present invention have been shown and described, it is to be understood that many changes and modifications may be made thereunto without departing from the spirit and scope of the invention.

What is claimed is:

1. A retroreflector comprising:
    a regular arrangement of multiple reflective triples of a first type, each triple having first, second, and third side surfaces of the first type approximately perpendicular to one another, in pairs, and defining a cube corner having an apex;
    wherein the first, second, and third side surfaces of the first type extend in first, second and third planes, respectively, intersecting in the apex;
    wherein each triple of a first set of selected triples of the first type has a recess or an elevation forming a triple of a second type;
    wherein each triple of the second type has at least first, second, and third side surfaces of the second type approximately perpendicular to one another, in pairs;
    wherein each triple of the second type is neither positioned in the apex of the respective triple of the first type nor positioned at a low point between triples of the first type; and
    wherein the first, second, and third planes respectively spanned by the first, second, and third side surfaces of the first type of three adjacent triples of the first type intersect at the low points.

2. The retroreflector according to claim 1, wherein each recess is a cube-shaped recess in a surface of a related cube corner.

3. The retroreflector according to claim 1, wherein each elevation is a cube-shaped elevation projecting out of a surface of a related cube corner.

4. The retroreflector according to claim 1, wherein the triples of the second type are disposed at an identical location of the selected triples of the first type.

5. A security element comprising the retroreflector according to claim 1.

6. The retroreflector according to claim 1, wherein at least two edge lengths of the triples of the second type are at most half as large as corresponding edge lengths of the triples of the first type.

7. The retroreflector according to claim 6, wherein all the edge lengths of the triples of the second type are at most half as large as the corresponding edge lengths of the triples of the first type.

8. The retroreflector according to claim 6, wherein a third edge length of the triples of the second type is the same size as a corresponding third edge length of the triples of the first type.

9. The retroreflector according to claim 1, wherein each of the side surfaces of the second type of at least part of the triples of the second type is oriented parallel to one of the side surfaces of the first type.

10. The retroreflector according to claim 1, wherein at least some of the triples of the second type are tilted relative to related triples of the first type.

11. The retroreflector according to claim 1, wherein at least one of the side surfaces of the second type of at least one of the triples of the second type has a curvature.

12. The retroreflector according to claim 1, wherein at least one of the side surfaces of the second type of at least one of the triples of the second type has an optical element, wherein the optical element covers at most one-third of the surface content of the side surfaces of the second type and comprises a micro-lens, a cylinder lens, a polarization filter or a refraction lattice.

13. The retroreflector according to claim 1, wherein the selected triples of the first type are disposed according to a predetermined pattern that is to appear on the retroreflector.

14. The retroreflector according to claim 9, wherein the tilting of the triples of the second type is selected according to a predetermined pattern.

15. The retroreflector according to claim 1, wherein the retroreflector is produced by injection-molding from polymethyl methacrylate (PMMA), polycarbonate (PC), silicone, or a plastic transparent under visible light.

16. The retroreflector according to claim 1, wherein the retroreflector is printed by a 3D printer, wherein a basic printing compound used for printing is selected so that the basic printing compound is transparent under visible light, at least after curing.

17. An injection-molding mold for production of the retroreflector according to claim 1, comprising an injection-molding mold surface, wherein the injection-molding mold surface is a negative of a reflection surface formed by the side surfaces of the first type and of the second type.

18. The injection-molding mold according to claim 17, wherein the injection-molding mold is produced by micro-cutting or by galvanic molding of a micro-section, wherein each partial surface of the injection-molding mold surface that represents a negative for a triple of the first type and/or a negative for a triple of the second type is individually processed by micro-cutting.

* * * * *